Oct. 8, 1940.    C. BOCKIUS ET AL    2,217,001
FRICTION MATERIAL
Filed Jan. 23, 1937
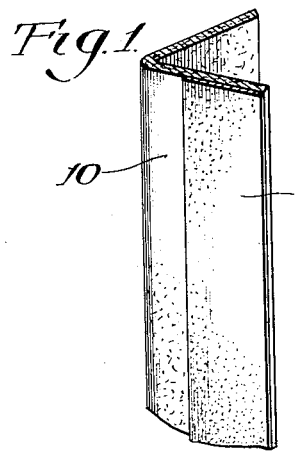
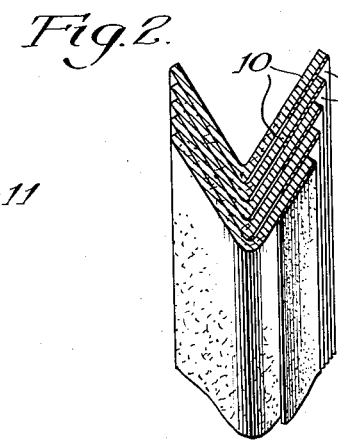
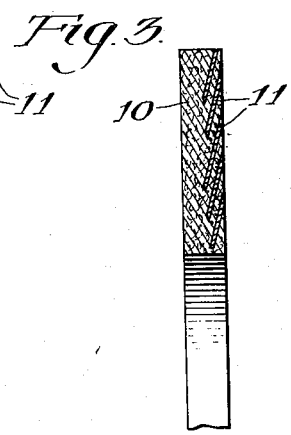
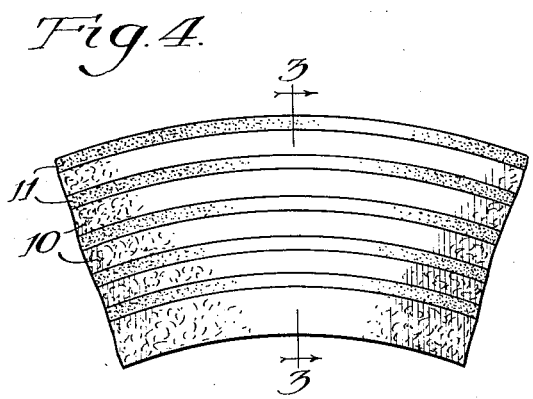
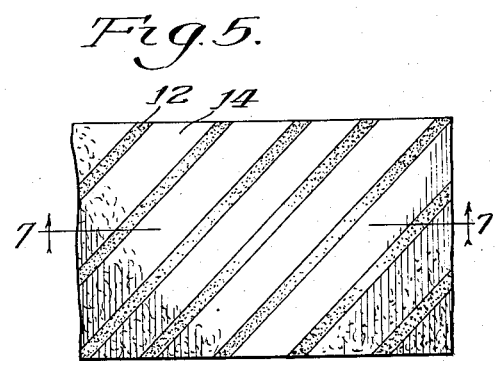
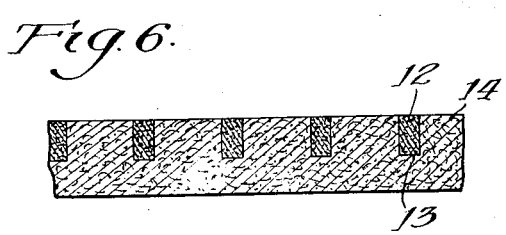
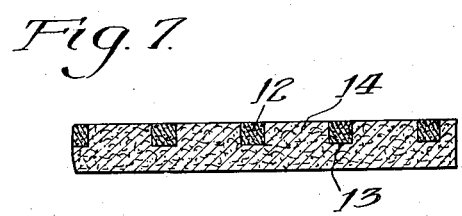
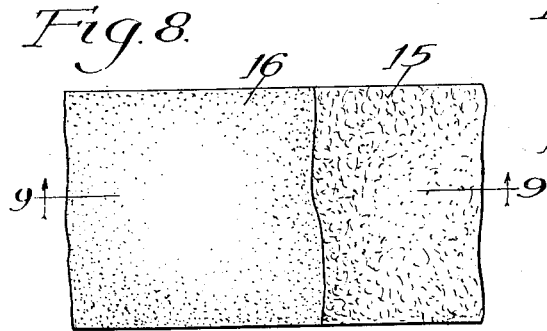
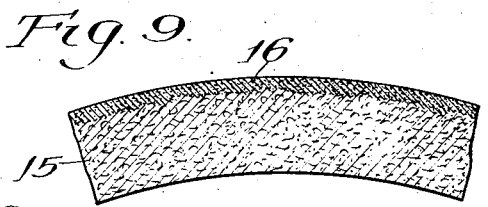
Inventors:
Chris Bockius,
Clyde S. Batchelor,
Judson H. Cook.
By Lee J. Gary
Attorney Patented Oct. 8, 1940

2,217,001

UNITED STATES PATENT OFFICE 2,217,001

FRICTION MATERIAL

Chris Bockius, Stamford, Conn., and Clyde S. Batchelor, Hasbrouck Heights, and Judson A. Cook, Paterson, N. J., assignors to Raybestos-Manhattan, Inc., Passaic, N. J., a corporation of New Jersey Application January 23, 1937, Serial No. 121,931

2 Claims. (Cl. 192—107)

This invention relates to improvements in friction materials for use as clutch facings, brake linings, and the like, by the use of metal spraying as a means of incorporating metals in or on the base material which may be metal wool, cork, fibrous pulp, or other suitable materials, but, as most often used, constitutes an asbestos base, a selected binder such as oxidized or polymerized oils, resins, rubbers or the like, having relatively soft and ductile metal incorporated therein, and to a process of making such friction materials.

The invention refers specifically to the manufacture of a friction material of the character described which has relatively soft and ductile metal particles incorporated therein by spraying the friction material with heated metal of the character described in atomized, molten, plastic or semi-plastic condition projected at relatively high velocity in molten state.

It has been proposed to incorporate relatively soft and ductile metal particles such as lead, zinc, Babbitt metal, solder, and combinations thereof with friction materials of the class described to impart to said friction material certain desirable properties such as stabilized friction, lubricity, reduction or elimination of chattering, reduction or elimination of the tendency to score engaging surfaces, and for other reasons.

The present invention is directed more particularly to improvements in the method of incorporating such relatively soft and ductile metals or other types of metals with friction materials of the character described which has definite advantages, to produce a friction material containing such metal in a condition serving to inherently include all of the properties desired in such material.

The process broadly contemplates the spraying of friction material of the character described with the heated metal before or after the incorporation of conventional binders.

In carrying out our invention, a suitable base material, usually asbestos or other fibrous material, which is woven into a cloth, bonded together by felting action, or bonded by rubber or resinous binder, is sprayed with the heated metal. To spray the base material one or more spray guns or other projecting means suitable for projecting molten metal at high velocity are employed. If a spray gun is used compressed air or a compressed inert gas may be employed as the carrier or projecting medium for the metal. The metals sprayed may comprise pure metals, mixtures of metals or predetermined metals which when heated to the molten state and sprayed upon the base material may or may not form an alloy.

As an example of our invention, copper and a 60–40 lead-tin alloy may be sprayed upon an untreated base material. The metals may be sprayed simultaneously or separately to form either a homogeneous combination or layers of the different metals. In either case the impingement of the metal is so great that the metal penetrates into or between the fibers of the base material and creates a satisfactory bond. If the base is initially untreated, the same after spraying is filled with the customary binders, pressed, cured and finished to desired dimensions. The surface then presents metallic inlays held in place by the binder and its interlock with the base material due to the high velocity impingement.

Of course, base material treated with a heat hardenable binder may be sprayed which is subsequently formed into friction elements, clutch facings or brake linings or the like.

Other objects and advantages of our invention will be apparent from the accompanying drawing and following detailed description, wherein—

Fig. 1 is a fragmentary view of a single convolution of a spirally wound clutch facing carrying a sprayed metal coating.

Fig. 2 is a cross-sectional view of a spirally wound clutch facing showing the internesting of the convolutions before compression and cure.

Fig. 3 is a sectional view taken along the line 3—3 of Fig. 4 after compression and cure.

Fig. 4 is a fragmentary view of the facing after compression and cure.

Fig. 5 is a fragmentary face view of a brake lining provided with metal inlays derived from metal spraying.

Fig. 6 is a cross-section, before pressing and curing, along the line 7—7 of Fig. 5.

Fig. 7 is a sectional view illustrating the same section as Fig. 6 after compression and cure.

Fig. 8 is a fragmentary face view, with parts broken away, of a friction element such as a brake block or clutch facing after grinding; and Fig. 9 is a sectional view of Fig. 8 on the line 9—9 thereof.

Referring to the drawing, strips of treated fabric 10 have been sprayed with metal 11 and then formed into the so-called endless spirally wound clutch facings as shown in Fig. 2. The facing was then pressed as shown in Fig. 3 and cured. After grinding the facing, the sprayed metal appeared as a long spiral on the facing surface as best shown in Fig. 4, the metal, of course, following the spiral contour of the strip. Obviously, the width of the metal comprising said spiral depends on the thickness of the spraying. The spiral metal inlay formed in this manner may or may not be continuous as shown in Fig. 3 from the front to the back of the facing. However, if it is continuous it materially aids heat conductance.

When metallic inlays similar to the above are composed of a relatively low melting metal or metals and a relatively high melting metal or metals, the abrasion of service causes the formation of a plastic metal film on the working surface, which, when abraded from the surface, is re-deposited in a new location which, we believe, accounts for the exceptionally good wear resistance. The higher melting metal stabilizes the metal film and allows the lower melting constituent to be fed as from a wick from the inlay when the fusion point of the metal is reached, which smooths the action of the braking or clutch operation.

When spraying base material which has been previously treated with a heat hardenable binder, it is preferable that the temperature of the atomized metal impinging upon said base material be not too high, since it may unduly heat the base material adjacent the point of metal impingement and cause localized curing or even disintegration of the heat hardenable binder. If the binder is such that it cures rapidly or at a relatively low temperature, the spraying operation is preferably conducted in such a manner that the atomized particles of metal lose a considerable portion of their heat in passing from the metal projecting means to the base material. However, it is desirable that the metal be sufficiently hot at the moment of impact on the base material to permit its entrance into the pores of the base material. In other words, it is desirable that the metal be, at least plastic.

However, it is not to be understood that in some cases the metal may not be molten at impact for the undesirable localized curing action which is to be avoided can be avoided even when the impacting metal is in the molten state. Curing, of course, is a heat-time operation and consequently the heat built up upon the base material can be controlled by controlling the rate at which the metal arrives at the base material, radiation and conduction acting to maintain the heat below desired limits.

One embodiment of our invention as shown in Figs. 5, 6 and 7 resides in the spraying of molten metal 12 in depressions 13 in the working or bearing surface of the friction element 14 to form metal inlays in the friction material. To accomplish this result, indentations 13 are molded or otherwise provided preferably in the working face of the base material. The indentations are then filled by spraying with molten metal 12. By providing the indentations of suitable depth for anchoring, there is no danger of the inlaid metal becoming loosened. As an example, the following composition has been found suitable: 70% Cu, 20% Pb, and 10% Sn. Of course, the composition suggested is merely set forth for purposes of illustration and it is not intended to convey the impression that this composition is the only suitable material, since other metal compositions or single metals may be used. In all cases where a plurality of metals are sprayed, the metals may be sprayed simultaneously or in sequence.

If desired, the entire bearing or working surface of the fibrous base material 15 (clutch facing or brake lining shown in Figs. 8 and 9) may be sprayed with the selected relatively soft and ductile metal 16 or combinations thereof to provide a continuous coating of relatively soft and ductile metal on the base material to serve as a friction surface.

A friction facing now known to the art as a "chevron" facing as illustrated in Figs. 1 to 4 can also be sprayed with molten metal. In constructing the "chevron" type facing a continuous strip of friction material 10 in fabric form is longitudinally folded and wound spirally so as to form an internested spirally wound body, a section thereof being shown in Fig. 2.

When such a facing is sprayed, the spiral convolutions are initially wound relatively loosely so that the exposed surfaces thereof receive the metal spray, that is to say, the edge of the working surface is substantially spaced from the edge of the working surface of the next adjacent convolution. After such surface has been sprayed, the nesting is then preferably rewound to substantially its final desired diameter before molding and compression.

If desired, in the fabrication of the so-called chevron facing, the fabric strip or tape may be sprayed with the relatively soft and ductile metals longitudinally thereof prior to the folding and winding or nesting thereof. The sprayed coating may cover one entire surface of the tape or may only cover the longitudinal half, more or less, on one surface, so that when the sprayed tape is folded the exposed or working surface is coated with the sprayed film.

There are several decided advantages in the spray method of the present invention some of which are as follows:

The sprayed metal, due to its plasticity and high projected velocity penetrates into the interstices between the fibers and/or into the pores or irregularities of the surface of the base being sprayed to such an extent that a high degree of adhesion or interlocking is secured between the metal and the base.

Also, and this of particular importance, the temperature of the metal at the zone of application is sufficiently low so that there is no objectionable or localized hardening or curing of the binder. Thus, when the element is subsequently heat treated to cure and set, the binder will cure uniformly throughout the thickness and area thereof. This is primarily due to the fact that the rate of application of the sprayed metal and the rate at which the metal builds up in any pre-determined locality is so low as to permit dissipation of heat thus preventing an objectionable rise in temperature. When a conventional metal spray gun is used for projecting the molten metal it is preferable that the discharge of the gun be maintained a sufficient distance from the base material being sprayed to prevent heat radiation from the heat source of the gun itself from raising or otherwise influencing the temperature of the sprayed base. Moreover, by maintaining the discharge nozzle too close to the base material, the metal being discharged impinges upon the base material at an excessively high temperature which would tend to create premature localized hardening of the binder adjacent the zone of impingement. Such localized hardening of the binder may render the entire element unsuitable for use as a friction element by so decreasing its frictional quality that it is of little or no value for its intended purpose.

Obviously, if the binder is decomposed or hardened to a degree greater than the hardening to which it subsequently will be subjected, it may not operate efficiently. In addition, the asbestos or other fiber in or adjacent to such localized area or areas, may be chemically decomposed because of loss of water of crystallization.

Metals which may be sprayed by our process may comprise lead, tin, antimony, babbitt, type metal, solder, zinc, aluminum, copper and soft iron. Of course, other metals and alloys having the property of imparting desirable frictional qualities are also contemplated. Although we have described our invention in regard to its application to fibrous materials because of their common usage as friction material, non-fibrous base materials are contemplated also, such as, sand blasted metal, irregular shaped surfaces and other porous materials.

We claim as our invention:

1. A friction material comprising a fibrous base and a hardened non-metallic binder having an irregular surface, the irregular surface only of said base being filled with particles of relatively ductile metal, portions of said metal particles being integrally united with one another and interlocked in the irregularities of the base surface.

2. A friction material comprising essentially a fibrous base and a hardened non-metallic binder, the wearing surface only of which comprises particles of a relatively ductile metal penetrating such wearing surface and inherently interlocked with the fibrous base, portions of said metal particles being integrally united with one another.

CHRIS BOCKIUS.
CLYDE S. BATCHELOR.
JUDSON A. COOK.